(12) United States Patent
Hammonds

(10) Patent No.: US 6,228,273 B1
(45) Date of Patent: May 8, 2001

(54) APPARATUS AND METHOD FOR CONTROL OF RATE OF DISSOLUTION OF SOLID CHEMICAL MATERIAL INTO SOLUTION

(75) Inventor: Carl L. Hammonds, Humble, TX (US)

(73) Assignee: Hammonds Technical Services, Inc., Houston, TX (US)

(*) Notice: Subject to any disclaimer, the term of this patent is extended or adjusted under 35 U.S.C. 154(b) by 0 days.

(21) Appl. No.: 09/376,547

(22) Filed: Aug. 18, 1999

Related U.S. Application Data

(60) Provisional application No. 60/097,705, filed on Aug. 21, 1998.

(51) Int. Cl.$^7$ .................................................... C02F 1/48
(52) U.S. Cl. .......................... 210/748; 210/205; 422/128
(58) Field of Search ............................ 422/128; 210/748, 210/205

(56) References Cited

U.S. PATENT DOCUMENTS

| | | |
|---|---|---|
| 2,717,874 | 9/1955 | Verain . |
| 3,582,285 * | 6/1971 | Hamilton . |
| 3,956,132 | 5/1976 | Takemitsu . |
| 4,720,374 * | 1/1988 | Ramachandran ..................... 422/310 |
| 4,749,537 * | 6/1988 | Gautschi et al. ..................... 264/232 |
| 4,961,860 | 10/1990 | Masri . |
| 5,124,050 | 6/1992 | Ushimaru et al. . |
| 5,218,983 * | 6/1993 | King ......................................... 137/1 |
| 5,395,592 | 3/1995 | Bolleman et al. . |
| 5,976,385 * | 11/1999 | King ..................................... 210/754 |
| 6,090,295 * | 7/2000 | Raghavarao et al. . |

* cited by examiner

*Primary Examiner*—Chester T. Barry
(74) *Attorney, Agent, or Firm*—Gary L. Bush; Mayor, Day, Caldwell & Keeton, LLP

(57) ABSTRACT

An apparatus and method for dissolving various forms of chemicals in solid material form into a liquid solution is disclosed. The apparatus includes a fluid reservoir to which an ultrasonic generating device is attached, capable of creating an acoustic wave that induces alternating compression and rarefaction fronts that react with microscopic inclusions in the liquid to produce cavitation. The cavitation phenomenon works on microscopic inclusions or bubbles or entrained air and or vapor of the liquid. The release of energy during this process causes solids held together by binders to become separated and be blended into solution at a consistent and predictable rate. The chemical to be supplied may be in solid form either in a pelletized or granular form arranged in a vertical column with only the lower portion of the column submerged in the solution with the level of submersion being adjustable. As fluid is circulated through the reservoir, chemical is introduced to the solution providing consistent dissolution of chemical. Solution strength is determined by a combination of flow rate through the reservoir, intensity and/or frequency of the ultrasonic action and the submersion level of the solid chemical material. Solution is delivered to various processes through either gravity flow as it exits the reservoir or a pump capable of delivering the solution into a pressurized line or vessel.

15 Claims, 2 Drawing Sheets

APPARATUS AND METHOD FOR CONTROL OF RATE OF DISSOLUTION OF SOLID CHEMICAL MATERIAL INTO SOLUTION

REFERENCE TO PRIOR APPLICATION

This application claims priority from Provisional Application 60/097,705 filed Aug. 21, 1998.

BACKGROUND OF THE INVENTION

1. Field of the Invention

This invention relates generally to the field of controlling the rate of dissolution of solid chemical material, such as in tablets, granules, etc., into liquid solution. In particular the invention relates to controlling the rate of dissolving calcium hypochlorite tablets or "pucks" in water for making the water safe for drinking by human beings.

2. Description of the Prior Art

Water used for human consumption, food processing, industrial cooling, washing, swimming and lubrication requires various levels of disinfection in order to prevent growth of various bacteria and fungi that threaten human health as well as damage industrial equipment and processes. Calcium hypochlorite is but one of several popular chemicals used for disinfection. However, calcium hypochlorite must be introduced in a controlled manner which will ultimately produce residuals in water in the range of 0.1–5 PPM (parts per million).

Erosion has been the primary means of dissolving solid chemical tablets or granules in the past. Submitting chemical tablets, pellets, solid cylindrical sticks or granules to a controlled flow rate of water has been used to dissolve the solid. Varying the flow rate, which in effect changes the rate of erosion of the solid chemical material through surface friction of liquid abrading against the solid, has been the primary means of control. A higher flow rate dissolves more chemical material into the water, and vice versa.

Varying of the flow rate accomplishes one of two goals. It either increases velocity of the water against the same amount of solid chemical material, or raises the liquid level in the reservoir which increases the amount of wetted surface of the solid chemical material. A combination of a more intense erosive action or greater wetted surface area of the chemical material theoretically changes the concentration of the solution being created by the process.

Current erosion feeder technologies all share common shortcomings. Since the various shapes of solids are typically stacked either in an orderly form or applied randomly within a container, their surface geometry varies relative to the direction of flow of the dissolving fluid. Some surfaces are perpendicular to the flow and some are at various angles; therefore the erosive effect of the fluid against the solid varies throughout a given load of tablets. Since solid tablets are typically arranged in a vertical column above the wetted area, and are fed through gravity weight of the tablets as dissolution takes place, the dissolution rate also varies with any given flow rate of fluid across the exposed tablets. As the dissolution varies, so does the strength of the resulting solution exiting the system.

Erosion feeders break down solid chemical tablet structure largely through the action of water molecules physically abrading the solid chemical material (e.g. tablet), causing it to be dissolved. The erosion action of the water on the tablets of the feeder varies with changes in velocity and resulting intensity of the eroding fluid striking the tablet. Therefore, subtle differences in the shape and attitude of the chemical solid material in relation to the direction of flow of fluid affects the rate and consistency of erosion. Erosion rates are further influenced by increasing or decreasing the amount of solid chemical material being exposed to the eroding flow of fluid. This occurs when the fluid level within the feeder is changed or when the fluid flow rate within the feeder is changed.

Controlling the flow rate of the dissolving fluid across the wetted area of the solid chemical material requires various controls, valves and fluid flow measuring equipment. Since system supply pressure of such dissolving fluid can and often does vary, maintaining a consistent erosion rate and subsequent solution strength is extremely difficult, often requiring a complex system of controls. If automatic controls are called for, the mechanical actuation of such controls is often complex and costly.

"Turn-down", or the ability to vary the amount of chemical into liquid of the feeder, is extremely important. Since erosion rates of various solid chemical materials (of tablets or granules) depends largely on a physical action point, the rate of erosion often becomes unpredictable in the lower ranges. Current technology erosion feeders do not typically produce a linear response to changes in flow rates. As a result, when systems are "turned-down" from very high chemical dissolution levels to very low levels, consistency and accuracy is sacrificed. Therefore, large systems are not generally capable of delivering very small chemical dissolution levels, and smaller systems have upper limits due to volumetric capacity of both solid chemical and eroding fluid.

Erosion feeders depend on relatively large volumes of liquid to effect the erosion process. Therefore, applications requiring small amounts of dissolved chemical at a very precise rate are not generally applicable. Fluid handling equipment such as pumps and piping must be sized to handle large volumes of liquid, and since the control of the system is accomplished through varying the flow rate through the chemical deliverer (e.g., chlorinator), the equipment used to deliver the final solution must also be controllable, making the choice and arrangement of these various flow controlling devices critical to feeder performance.

Erosion is further complicated because the process of producing various chemicals in solid form depends on the application of chemical binders and hydraulic compaction. Even subtle variations in the manufacturing process causes inconsistencies in dissolution rates, because the solids often have soft or hard areas within the solid form. This factor makes water velocity and angle of incidence even more critical in the erosion process.

Since many water disinfection applications require extremely small amounts of chemical residual to be placed into solution, current technology does not provide consistent performance due to excessive flow rates required to effect dissolution. The inconsistent performance has been due to difficulties in controlling the flow volume and complexity of the system. As a result prior technologies have not been cost-effective. Installations such as very low volume water wells and chemical processes require only minute quantities of chemical in very small amounts of treating solution. Current technology cannot provide these levels of delivery and consistency since residual chemical must be delivered in as little as 0.5 parts per million.

IDENTIFICATION OF OBJECTS OF THE INVENTION

A principal object of the invention is to provide a method and apparatus for controlling the rate of a solid chemical dissolution into a liquid which does not rely on varying the flow rate of the liquid across the solid chemical material.

Another important object of the invention is to provide a water chlorination system which is capable of dissolving small quantities of chlorine at consistent levels (parts per million) in small amounts of water.

SUMMARY OF THE INVENTION

The invention relates to the dissolution of any solid chemical material into any liquid in order to control the rate of chemical dissolved in that liquid. The preferred embodiment of the invention is to dissolve a solid source of chlorine, e.g., calcium hypochlorite tablets or "pucks", into water for chlorinating the water in order to make it safe for drinking, washing, and the like. Fresh water enters a tank which has a perforated cylinder filled with solid chlorine-source tablets or granules such as calcium hypochlorite. A source of ultrasonic energy produces cavitation of the water in the tank. The cavitating water erodes the calcium hypochlorite puck or granules. The higher the level of ultrasonic energy applied, the higher the cavitation of the water in the tank, and the higher the resulting rate of erosion and dissolution of the solid chemical material into the water. Thus, the rate of dissolution of chemical, e.g. chlorine into water, is controlled by varying the intensity of ultrasonic waves in the water from an ultrasonic generator.

BRIEF DESCRIPTION OF THE DRAWINGS

The objects, advantages, and features of the invention will become more apparent by reference to the drawings which are appended hereto and wherein like numerals indicate like parts and wherein an illustrative embodiment of the invention is shown, of which.

DESCRIPTION OF THE PREFERRED EMBODIMENT OF THE INVENTION

Figure 1:
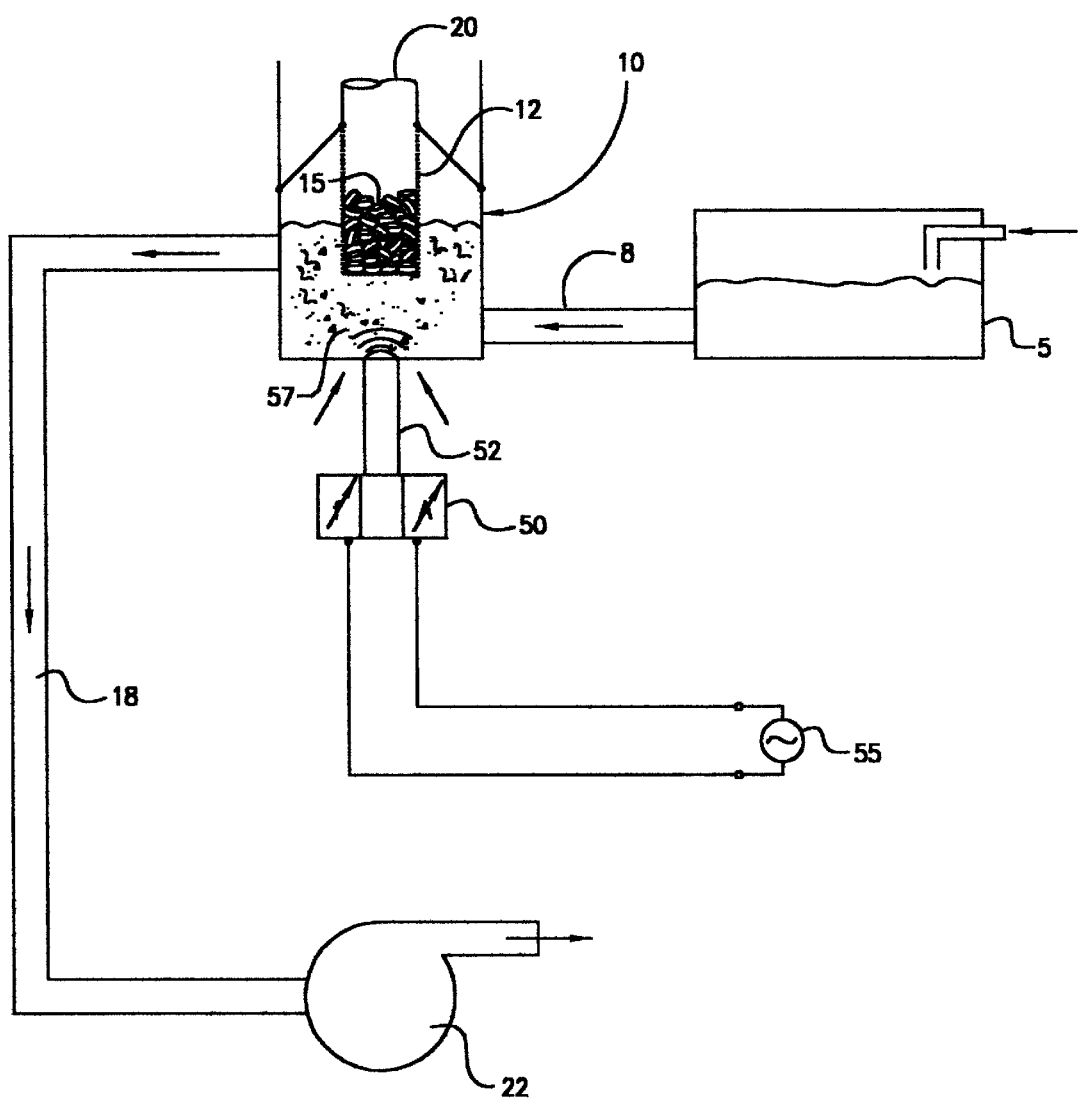
FIG. 1 is a schematic illustration of the apparatus of the invention showing the application of controlled ultrasonic energy to a water tank thereby producing cavitation in a tank for the erosion of solid chemical material into a liquid.

FIG. 1 shows the apparatus of this invention which includes a water tank 10 arranged and designed for the dissolving of chlorine from solid chemical material, such as tablets or pucks 15 or granules of calcium hypochlorite. The preferred embodiment of chlorinating water is but a species of the generic invention of dissolving chemical into any liquid from any solid chemical source. FIG. 1 shows that a tank 5 receives a source of fresh water prior to its final chlorination stage to make the water suitable for human use, such as drinking, bathing, etc. A line 8 feeds water to a chlorination tank 10 which includes a chlorination tablet column 20 filled with granules or tablets (pucks) of calcium hypochlorite. Perforations 12 in the column allow the water in the tank 10 to fill the column 20 at substantially the same level as that of tank 10. Typically, the column 20 is filled with tablets 15 or granules to a level which extends above the level of water in the tank 10 so that as the tablets erode, more tablets are lowered by gravity and sink into the liquid of the tank, thereby continuing the dissolution process.

An ultrasonic generator 50, controlled by a power source 55, applies ultrasonic waves 57 via inlet 52 in order to produce cavitation of the liquid in tank 10. The cavitating water, via the perforations 12 in the column, act on the tablets 15 to dissolve or erode them. The intensity of cavitation can be controlled in one or both of two modes. The first is to change the intensity of the ultrasonic waves by varying the input to the ultrasonic generator 50, e.g., by power source 55. The second is to change the frequency of the ultrasonic waves by varying the ultrasonic controls 50.

Figure 2:
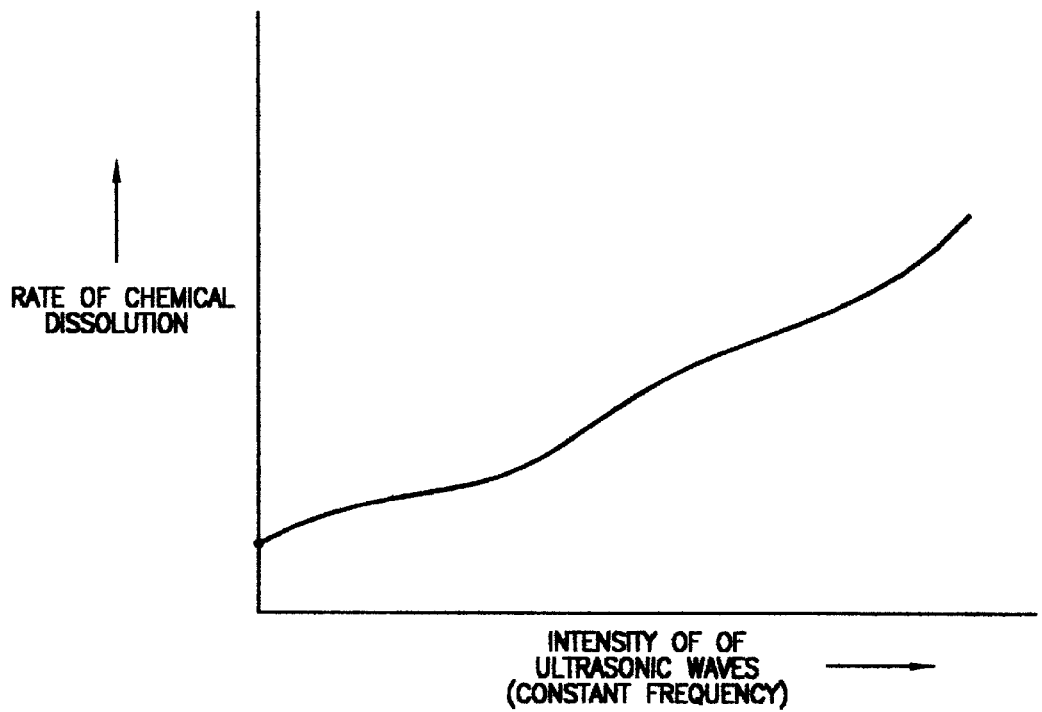
FIG. 2 is a graphical illustration of the rate of dissolution of solid chemical material into liquid as a function of intensity of ultrasonic energy applied.
Figure 3:
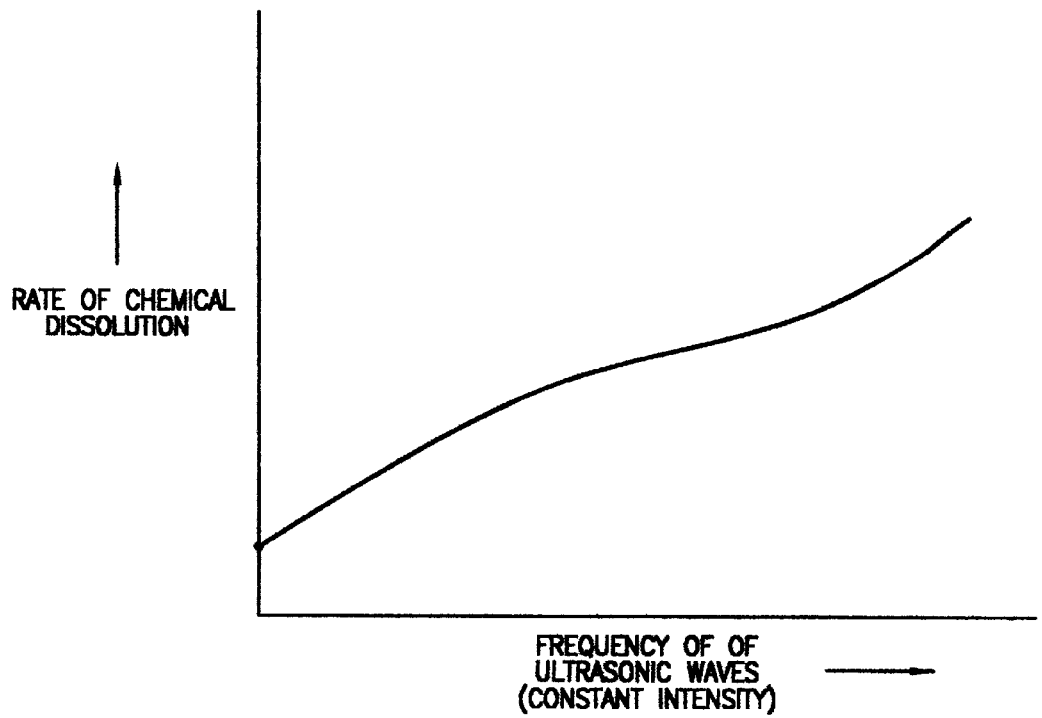
FIG. 3 is a graphical illustration of the rate of dissolution of solid chemical material into liquid as a function of frequency of ultrasonic energy applied.

FIG. 2 shows that the rate of chemical dissolution increases with increases in the intensity of the ultrasonic waves applied to tank 10, and FIG. 3 shows that the rate of chemical dissolution increases with the frequency of ultrasonic waves. A combination of intensity and frequency control can be arranged and designed to precisely control the rate of chemical dissolution for any solid chemical source material and liquid, but specifically for calcium hypochlorite and water.

A pump 22 connected to a line 18 from tank 10 produces an output stream of water at substantially constant flow rate. As a result, the flow rate in line 8 which inputs water into tank 10 is at a substantially constant flow rate, and the level of water in the tank 10 is at a substantially constant level. Nevertheless the level of liquid in tank 10 may be varied thereby further controlling the rate of dissolution of chemical into the liquid in the tank.

The controlled use of ultrasonic waves into the water of tank 10 changes the erosion process of tablets 15. Erosion is effected through the use of cavitation within the fluid, causing the formation of microscopic bubble inclusions that work against the dry solid chemical material in all directions without consideration to the velocity of liquid flow moving through the process. Further, erosion is precisely controlled by increasing or decreasing the intensity or frequency (or both) of cavitation within a given volume of water. Since the process works equally well in large or small volumes of fluid, neither the volume of water nor the flow rate of water moving across the chemical tablets is critical. The intensity of ultrasonic cavitation is matched with whatever volume of fluid is present in order to effect the desired degree of dissolution. Control of the process is reduced to a simple electrical control that varies the intensity of the ultrasonic modulation within the fluid. Flow rates of fluid can remain constant, but of course can be varied if desired.

Since the excitation of inclusions or microscopic bubbles with a fluid through cavitation is capable of producing very aggressive dislodging of solids, the process lends itself to the breakdown of solid materials being placed into solution through dissolution.

What is claimed is:

1. Apparatus for controlling the dissolution rate of solid chemical material, comprising a fresh water tank, a fluid holding tank having a fluid inlet fluidly connected to said fresh water tank and a fluid outlet line and an interior space for holding fluid, said fluid holding tank arranged and designed such that fresh water enters from said fresh water tank via said fluid inlet and treated water exits via said outlet line, a perforated chemical material feeder disposed in said tank, said feeder designed and arranged to hold said chemical material in an essentially vertical orientation, with said fluid in said tank entering and exiting perforations of said feeder to wet and dissolve at least a portion of said solid chemical material in said feeder, an ultrasonic generator having a probe coupled with said tank which applies ultrasonic waves to the interior of said tank for producing a cavitation intensity of said liquid in said tank and in said feeder, whereby said cavitation erodes said chemical material for dissolving in said liquid, and means for varying a characteristic of said ultrasonic waves in order to vary the rate of dissolution of said chemical material in said liquid.

2. The apparatus of claim 1 wherein, said characteristic of said ultrasonic waves is the intensity of the waves.

3. The apparatus of claim 1 wherein, said characteristic of said ultrasonic waves is the frequency of the waves.

4. The apparatus of claim 1 wherein, said perforated feeder is adapted to hold chemical material in the form of tablets.

5. The apparatus of claim 1 wherein, said perforated feeder is adapted to hold chemical material in the form of granular material.

6. The apparatus of claim 1 wherein, said chemical material includes calcium hypochlorite and said fluid is water.

7. The apparatus of claim 1 further comprising, a pump in said fluid outlet line, whereby, said pump in said outlet line establishes a flow rate of liquid through said tank.

8. A method for controlling the dissolution rate of solid chemical material placed in a perforated feeder disposed in a liquid holding tank which has a liquid inlet line and a liquid outlet line where the feeder is designed and arranged to hold said chemical material in a vertical orientation, with said liquid in said tank entering and exiting perforations of said feeder to wet and dissolve at least a portion of said solid chemical material in said feeder, the method comprising the steps of, producing a cavitation intensity of said liquid in said tank by means of ultrasonic waves to the interior of said tank, whereby said cavitation enters said perforated feeder and erodes said chemical material in said perforated feeder for dissolving in said liquid, and varying a characteristic of said ultrasonic waves in order to vary the rate of dissolution of said chemical material in said liquid.

9. The method of claim 8 wherein, said characteristic of said ultrasonic waves is the intensity of the waves.

10. The method of claim 8 wherein, said characteristic of said ultrasonic waves is the frequency of the waves.

11. The method of claim 8 further comprising the steps of, establishing a flow rate of liquid through said tanks and through said perforated feeder, whereby a level of chemical dissolution of said chemical material in said liquid of said liquid output line is a function of said flow rate of liquid through said tank and said cavitation intensity of liquid in said tank.

12. Apparatus for controlling the dissolution rate of solid chemical material comprising, a source of fresh water, a liquid holding tank having a fluid inlet and a fluid outlet line and an interior space for holding liquid, said fluid inlet fluidly connected to said source of fresh water, a perforated chemical material feeder disposed in said tank, said feeder designed and arranged to hold said chemical material in an essentially vertical orientation, with said liquid in said tank entering perforations of said feeder to wet and dissolve at least a portion of said solid chemical material in said feeder, and an ultrasonic generator having a probe coupled with said tank which applies ultrasonic waves to the interior of said tank for producing a cavitation intensity of said liquid in said tank and in said feeder, whereby said cavitation erodes said chemical material for dissolving in said liquid to produce treated liquid in said tank, said fluid outlet line being arranged and designed to transfer treated liquid from said tank.

13. The apparatus of claim 12 wherein, said ultrasonic generator includes a mechanism which varies a characteristic of said ultrasonic waves in order to vary the rate of dissolution of said solid chemical material.

14. The apparatus of claim 13 wherein, said characteristic of said ultrasonic waves is the intensity of the waves.

15. The apparatus of claim 13 wherein, said characteristic of said ultrasonic waves is the frequency of the waves.

* * * * *